United States Patent [19]

Takanashi

[11] Patent Number: 4,971,411
[45] Date of Patent: Nov. 20, 1990

[54] OPTICAL SCANNING SYSTEM

[75] Inventor: Kenichi Takanashi, Yokohama, Japan

[73] Assignee: Ricoh Company, Ltd., Tokyo, Japan

[21] Appl. No.: 426,685

[22] Filed: Oct. 26, 1989

[30] Foreign Application Priority Data

Nov. 7, 1988 [JP] Japan .................. 63-281085

[51] Int. Cl.$^5$ .................. G02B 26/10; G02B 3/02
[52] U.S. Cl. .................. 350/6.5; 350/434
[58] Field of Search .......... 350/6.1, 6.5, 6.6, 6.7, 350/6.8, 6.9, 6.91, 433, 434

[56] References Cited

U.S. PATENT DOCUMENTS

| | | | |
|---|---|---|---|
| 4,253,735 | 3/1981 | Kawamura et al. | 350/433 |
| 4,379,612 | 4/1983 | Hatsuoka et al. | 350/6.8 |
| 4,585,296 | 4/1986 | Minoura et al. | 350/6.8 |
| 4,712,884 | 12/1987 | Sakuma et al. | 350/434 |
| 4,804,981 | 2/1989 | Prakash et al. | 350/6.5 |
| 4,818,046 | 4/1989 | Kondo | 350/6.8 |
| 4,836,630 | 6/1989 | Takanashi | 350/6.8 |
| 4,859,011 | 8/1989 | Takahashi | 350/6.8 |

FOREIGN PATENT DOCUMENTS

| | | |
|---|---|---|
| 54-87540 | 7/1979 | Japan . |
| 61-120112 | 6/1986 | Japan . |
| 61-45805 | 10/1986 | Japan . |
| 61-48684 | 10/1986 | Japan . |

OTHER PUBLICATIONS

"Conference on Lasers and Electro-Optics", pp. 238–239, published 4/25/88, Anaheim, Calif.
"The Working of Toric Lens Surfaces" Manufacturing Optics, vol. 9, No. 10, Jul. 1956, pp. 528–534.

*Primary Examiner*—Bruce Y. Arnold
*Assistant Examiner*—Ronald M. Kachmarik
*Attorney, Agent, or Firm*—Oblon, Spivak, McClelland, Maier & Neustadt

[57] ABSTRACT

An optical scanning system includes a light source, a condenser lens for condensing a bundle of rays, a first image forming lens for converging the bundle of rays passed through the condenser to form a line image along a main scanning direction, a deflector having a deflection mirror to reflect the line image, and a second image forming lens for converging the bundle of rays deflected by the deflector on a scanning surface so as to form a scanning spot thereon. The second image forming lens includes a single lens. An imaginary converging point of the bundle of rays through the condenser behind the scanning surface is positioned in conjugate relation with the scanning surface. The deflection mirror is positioned in conjugate relation with the scanning surface. The single lens has a distorted cylindrical surface wherein refractive power in the sub-scanning direction varies along the main scanning direction and a toric surface wherein refractive power is positive and different for each of the main and sub scanning directions.

6 Claims, 9 Drawing Sheets

OPTICAL SCANNING SYSTEM

BACKGROUND OF THE INVENTION

The present invention relates to an optical scanning system.

The optical scanning system is well known to be assembled with a laser printer and used recently as an optical system of various electronic apparatuses such as a digital copying apparatus and a facsimile apparatus. Also, the optical scanning system is intended to be applied to a display unit or a measuring device.

The optical scanning system has a light deflection means which generally comprises a rotary polygon mirror or a galvanomirror which has a deflection mirror surface to deflect a light. In the optical scanning system in cooperated with such a deflection means, it is necessary to arrange an F-theta (f $\theta$) lens between the deflection means and a scanning surface to be optically scanned in order to maintain the scanning speed constant on the scanning surface and prevent uneven pitch of the scanning lines due to a tilt error of the deflection mirror surface.

On the other hand, the optical scanning system is always required to be small and simple in construction and economical in producing cost.

In order to make the optical scanning system small, it is necessary to widen the angle of field of the lens system arranged between the deflection means and the scanning surface so as to scan a long range with a short optical path length. In order to simplify the whole structure of the optical scanning system and reduce the cost thereof, it is necessary to simplify the structure of the lens system arranged between the deflection means and the scanning surface.

Various attempts for simplifying the lens system arranged between the deflection means and the scanning surface have been proposed so far for the purpose of realizing a small and simple optical scanning system at a low cost.

For example, Japanese Unexamined Patent Publication (Kokai) No. 54-87540 discloses an optical scanning system in which a divergent bundle of rays emitted from a light source is introduced into a lens system arranged between the deflection means and the scanning surface. However, this optical system is imapired by a curvature of field (image surface curvature) which is more than 5 mm for a half field angle of 15 to 17 degrees with respect to a focal length of 150 mm. Therefore, this known optical system is not satisfactory from the stand point of widening the field angle of the lens system.

Also, Japanese Unexamined Patent Publication (Kokai) No. 61-48468 discloses a F-theta lens composed of a single lens element. However, this lens is also impaired by a curvature of field wnhich is 5 to 10 mm for a half field angle of 21 degrees with respect to a focal length of 300 mm. Therefore, this proposed F-theta lens is not satisfactory from the stand point of widening the field angle of the lens as in the case of the publication previously mentioned.

SUMMARY OF THE INVENTION

The present invention was made considering the points mentioned above. It is therefore an object of the present invention to provide an optical scanning system which comprises a lens system arranged between a deflection means and a scanning surface and having a simplified structure in which the field angle of this lens system is widened and tilt errors of the deflection means are securely corrected.

The object of the invention can be achieved by an optical scanning system wnhich comprises: a light source; an optical condenser system which condenses a bundle of rays emitted from the light source; a first image forming system which converges the bundle of rays passed through the condenser system and forms an image of a line aligned with a main (horizontal) scanning direction; a deflection device having a deflection mirror surface in the vicinity of the position where the line image is formed; and a second image forming system which converges the bundle of rays deflected by the deflection device on a scanning surface.

The present invention is particularly characterized by the following points.

That is, the second image forming system which is arranged between the deflection device and the scanning surface comprises a single lens which is arranged in such a way that, with respect to the main (horizontal) scanning direction, the scanning surface and a convergent point of the bundle of rays converged by the condenser system which point is set behind the scanning surface are conjugate with respect to each other, while with respect to the sub-scanning (vertical scanning) direction, the scanning surface and a deflection point or the vicinity thereof of the bundle of rays deflected by the deflection device are conjugate with respect to each other.

The single lens mentioned above has a distorted cylinder surface side and in the opposed side thereof a toric surface side. The distorted cylinder surface has a function such that the refractive power in the vertical scanning direction varies in accordance with the position in the horizontal scanning direction. The toric surface has a function such that the refractive power in the horizontal scanning direction and that in the vertical direction are positive and different from each other.

As mentioned above, the present invention provides a novel optical scanning system.

Advantages of the above-mentioned optical scanning system are that the optical system is simplified since the second image forming system is composed of a single lens, that the deflection angle is widened since the field curvature in the vertical (sub) scanning direction is corrected by the characterized distorted cylinder surface which makes it possible to realize an optical scanning system of a small size and that an accurate and reliable optical scanning can be achieved by preventing uneven pitch of scanning lines since the tilt error of the deflection device is securely corrected.

Further objects and advantages of the present invention will be apparent from the following description of the preferred embodiments of the invention as illustrated in the accompanying drawings.

BRIEF DESCRIPTION OF THE DRAWINGS

FIG. 1b is a side view of the optical scanning structure of FIG. 1a;

DESCRIPTION OF THE PREFERRED EMBODIMENTS

The present invention is described in further detail hereinafter in comparison to the prior art.

Figure 14:
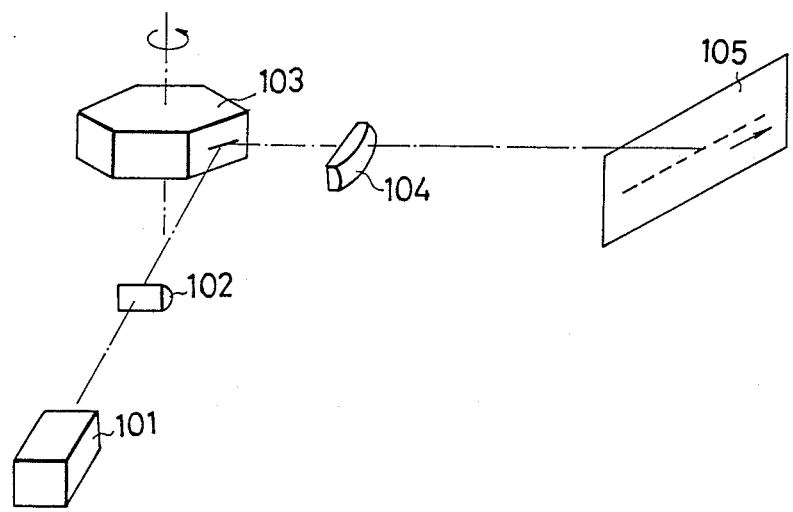
FIG. 14 is an explanatory view of an optical scanning system of prior art.

A schematic construction of a conventional scanning system is illustrated in FIG. 14. The present invention is applied to this type of scanning system structure.

As illustrated in FIG. 14, the optical scanning system comprises a light source 101, a cylindrical lens 102, a rotary polygon mirror 103, a scanning surface side optical system 104 and a scanning surface 105 to be optically scanned.

The light source 101 comprises an LED or a semiconductor laser generator.

The cylindrical lens 102 is arranged for reforming the diameter of the laser beam emitted from the light source 101 on the image surface. For example, a longitudinal beam elongated in the main scanning direction is obtained through the cylindrical lens 102.

The rotary polygon mirror 103 deflects and moves the laser beam in the horizontal direction so as to obtain a scanning beam.

The scanning surface side optical system 104 converges and forms an image of the scanning laser on the scanning surface 105. In order to prevent distortion of image irrespective of change of scanning deflection angle ($\theta$), this optical system 104 comprises an F-theta lens which has a focal length (f) and forms an image at a distance in proportion to the deflection angle, that is f $\theta$ from the optical axis of the lens and/or in combination with an anamorphic lens such as a cylindrical lens, if necessary. In accordance with this arrangement of the F-theta lens, the image distortion due to the deflection angle change is corrected and the scanning beam is moved at a constant speed on the scanning surface 105.

However, as mentioned before, in accordance with the optical scanning system of the prior art, it is not fully satisfactory in the points of simplicity of the system, width of the field angle of the lens and curvature of the field.

In contrast with such a prior art structure, an optical scanning system in accordance with the present invention has the following construction.

Figure 1A:
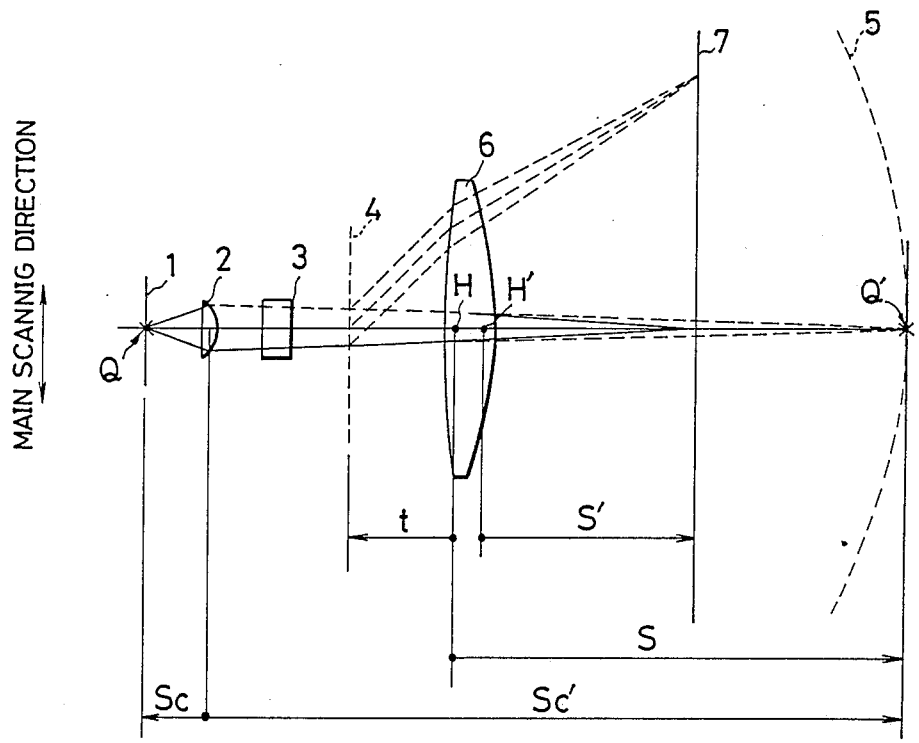
FIG. 1a is an explanatory plan view for explaining an essential structure and function of an optical scanning system in accordance with the present invention.
Figure 1B:
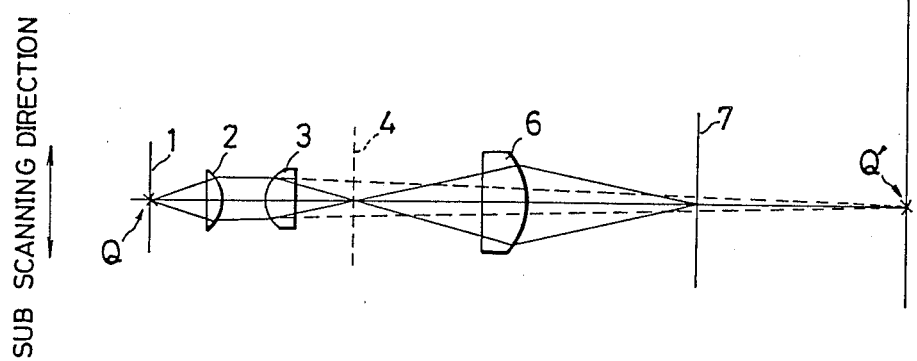

FIGS. 1a and 1b schematically illustrate an optical scanning system of the present invention.

FIG. 1a is a plan view of the optical scanning system wherein the whole of the scanning system is developed along the light path thereof and seen from the sub-scanning (vertical scanning) direction.

FIG. 1b is a side view of the optical scanning system of FIG. 1a wherein the scanning system is seen from the main (horizontal) scanning direction.

In FIGS. 1a and 1b, reference numeral 1 designates a light source. The light source 1 comprises a semiconductor laser generator or an LED and emits a divergent bundle of rays from a point source Q.

The divergent bundle of rays emitted from the light source 1 enters into a condenser lens system 2 which converges the divergent light. The bundle of rays would converges at an imaginary point Q' behind a scanning surface 7 if there were not interfering optical elements disposed along the light path thereof. Therefore, a convergent point of the rays through the condenser lens system 2 is the imaginary point Q'.

On the assumption that distances Sc and Sc' are defined as represented in FIG. 1a, the optical system satisfies the following equation.

$$(1/Sc)+(1/Sc')=1/fc$$

wherein fc is a focal length of the condenser lens system 2.

The bundle of convergent rays then enters into a first image forming optical system composed of a cylindrical lens 3. The cylindrical lens 3 has a positive power only in the vertical direction corresponding to the sub-scanning direction depicted by a double-headed arrow in FIG. 1b. The cylindrical lens 3 has no refractive power in the horizontal direction corresponding to the main scanning direction depicted by a double-headed arrow in FIG. 1a. Therefore, with respect to the main scanning direction seen from the vertical direction, as illustrated in FIG. 1a, the bundle of rays passes through the cylindrical lens 3 without being functioned by the cylindrical lens and propagates toward the convergent point Q'. On the other hand, with respect to the sub-scanning direction seen from the horizontal direction, as illustrated in FIG. 1b, the bundle of rays is converged by the function of the cylindrical lens 3 so that an image in the form of a line is formed at a position designated by numeral 4.

The longitudinal direction of the line image aligns with the main scanning direction.

The first image forming optical system may comprise a cylindrical concave mirror instead of cylindrical lens 3 mentioned above.

In FIGS. 1a and 1b, numeral 4 designates a position where a deflection mirror surface of a deflection device is disposed. The deflection mirror surface 4 is disposed at the position of or in the close vicinity of the line image formed by the cylindrical lens 3 and deflects the bundle of rays reflected by the mirror surface by the rotation of the deflection device. The deflection device may comprise a rotary polygon mirror or a galvanomirror.

The deflected bundle of rays then enters into a second image forming optical system 6 which converges the rays to form a spot image on a scanning surface 7.

The second image forming system 6 comprises an anamorphic single lens which has a different functional power with respect to the horizontal scanning direction (main scanning) and the vertical scanning direction (sub-scanning).

The second image forming system (lens) 6 functions in such a way that, with respect to the main scanning direction, the imaginary convergent point of the condenser lens 2 is made conjugate with the scanning surface 7, as illustrated in FIG. 1a, in which the imaginary convergent point moves along a circular arc 5 according as the bundle of rays is deflected by the deflection mirror 4. In this case, the convergent point becomes an imaginary light source for the second image forming lens 6.

On the other hand, with respect to the sub-scanning direction, the second image forming lens 6 functions in such a way that the position of the deflection mirror 4 is made conjugate with the position of the scanning surface 7. Therefore, with respect to the sub-scanning direction, the line image mentioned before is imaged on the scanning surface 7 by this second image forming lens 6.

In the drawings, references H and H' designate a front principal point and a rear principal point of the second image forming lens 6, respectively. On the assumption that the distances S, S' and t are defined as illustrated in FIG. 1a, the scanning system satisfies the following equations.

$$(-1/S)+(1/S')=1/fp$$

$$(1/t)+(1/S')=1/fs$$

wherein fp represents a focal length of the second image forming lens 6 in the main scanning direction and fs designates a focal length of the second image forming lens 6 in the sub-scanning direction.

The second image forming lens 6 comprises a single lens having an anamorphic charasteristic as mentioned before. This anamorphic lens has a distorted cylindrical surface side and in the opposite side a toric surface side. The distorted cylindrical surface functions so that the refractive power in the sub-scanning direction varies according to the position in the main sccanning direction. The toric surface has a different positive refractive power in the main scanning direction and sub-scanning direction, respectively. The distorted cylindrical surface corresponds to the surface of the second image forming lens in the side facing to the deflection mirror 4. The toric surface corresponds to the surface of the second image forming lens in the side facing to the scanning surface 7.

The anamorphic characteristic required to the second image forming lens 6 is satisfied by the toric surface.

The distorted cylindrical surface functions to correct curvature of field in the direction of sub-scanning.

By correcting curvature of field in the sub-scanning direction with the use of the distorted cylindrical surface having a featured shape, it becomes possible to elongate the scanning region and stably maintain the size of the scanning spot constant along the entire scanning region which means it becomes possible to widen the field angle of the second image forming lens 6.

The present invention is desired further hereinafter with respect to an embodiment thereof.

Figure 2:
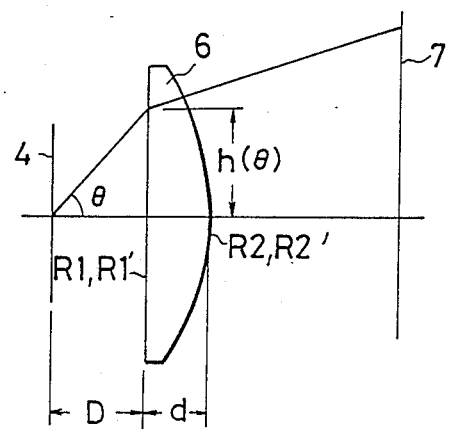
FIG. 2 is an explanatory view for explaining the radius of curvature of a second optical image forming system composed of an optical lens in accordance with the present invention.

Referring to FIG. 2, reference D represents distance between the deflection mirror surface 4 and the deflection mirror 4 side surface of the second image forming lens 6. Reference d represents thickness of the lens 6 at the center thereof. The second image forming lens 6 has a refractive index n.

Also, with respect to the lens surface in the deflection mirror 4 side, radius of curvature of this lens surface on the optical axis thereof is represented by reference R1 with regard to the main scanning direction and R1' with regard to the sub-scanning direction.

Whereas, with respect to the lens surface in the scanning surface 7 side, radius of curvature of this lens surface is represented by reference R2 with regard to the main scanning direction and R2' with regard to the sub-scanning direction.

Also, the focal length of the second image forming lens 6 in the main scanning direction is represented by reference fp. $\theta$ designates the deflection angle. The maximum deflection angle is represented by $\theta$max.

The embodiment of the invention is represented by specifying the factors mentioned above as follows.

D=34

R1=∞, R1'($\theta$=0)= −27.6, d=20, n=1.48519,

R2= −97.038, R2'= −11.4216

S=114.94, fp=200, $\theta$max=50° wherein a material of n=1.48519 is plastic.

The radius of curvature of the distorted cylindrical surface is infinite with respect to the main scanning surface, which makes the lens as a cylindrical shape. The radius of curvature with respect to the sub-scanning direction is, as described above, R1'($\theta$=0)= −27.6 on the optical axis of the lens. However, the radius of curvature with respect to the sub-scanning direction of this lens surface side varies according as the position in the main scanning direction changes. The position in the main scanning direction is represented, as illustrated in FIG. 2, by h($\theta$) which is the distance of the incident point of the deflected beam on the lens surface from the optical axis of the lens and which is the function of the deflection angle $\theta$. As can be seen from FIG. 2, the following equation is derived.

$$h(\theta)=D \tan \theta$$

Figure 3:
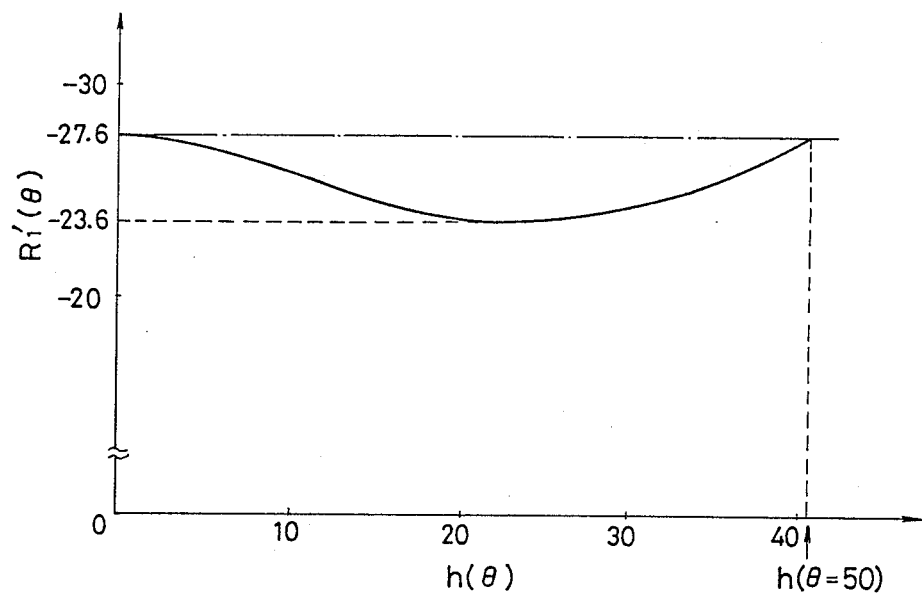
FIG. 3 is a graphical view representing the radius of curvature of one side of the lens of FIG. 2.

FIG. 3 is a graphical view which represents radius of curvature R1' of the distorted cylindrical surface with respect to the sub-scanning direction in relation to h($\theta$). The relationship between h($\theta$) and R1' is also represented numerically in the following table.

TABLE

| h ($\theta$) | 0 | 6.0 | 11.0 | 13.7 | 22.9 | 30.6 |
|---|---|---|---|---|---|---|
| R1' | −27.6 | −26.6 | −25.6 | −24.6 | −23.6 | −24.6 |
| h ($\theta$) | 35.2 | 37.7 | 40.5 | | | |
| R1' | −25.6 | −26.6 | −27.6 | | | |

The lens surface on the side facing to the scanning surface 7 has a shape which is defined by circular arcs of different radius of curvature with respect to the main scanning direction and the sub-scanning direction, respectively.

Figure 4:
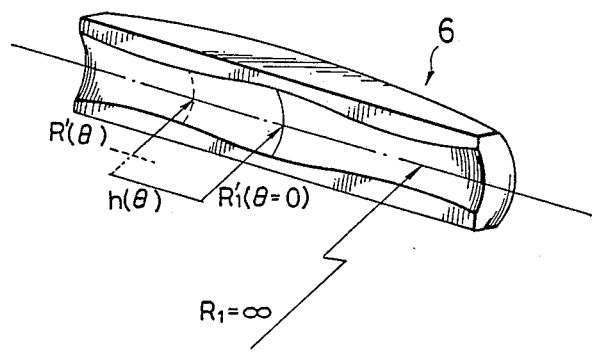
FIG. 4 is a perspective view of an example of a single lens constituting the second optical image forming system in accordance with the present invention.

FIG. 4 illustrates an outer view of an example of the second image forming lens 6.

Figure 5:
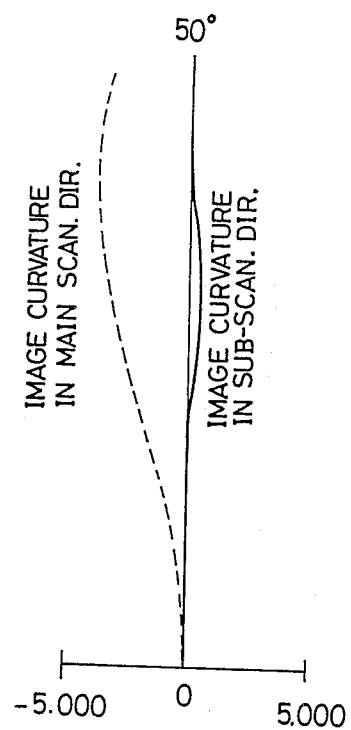
FIG. 5 is a graphical view representing image curvatures into the horizontal and vertical scanning directions with respsect to an embodiment of the present invention.

FIG. 5 is a graphical view of image curvature (curvature of field) of this embodiment. A dash line represents curvature in the main scanning direction. A solid line represents curvature in the sub-scanning direction.

As can be seen from the drawing, curvature of field is fully corrected with respect either to the main scanning direction and the sub-scanning direction, which makes it possible to widen the entire field angle to the extent of 100 degrees from 40 to 45 degrees of prior art.

Figure 6:
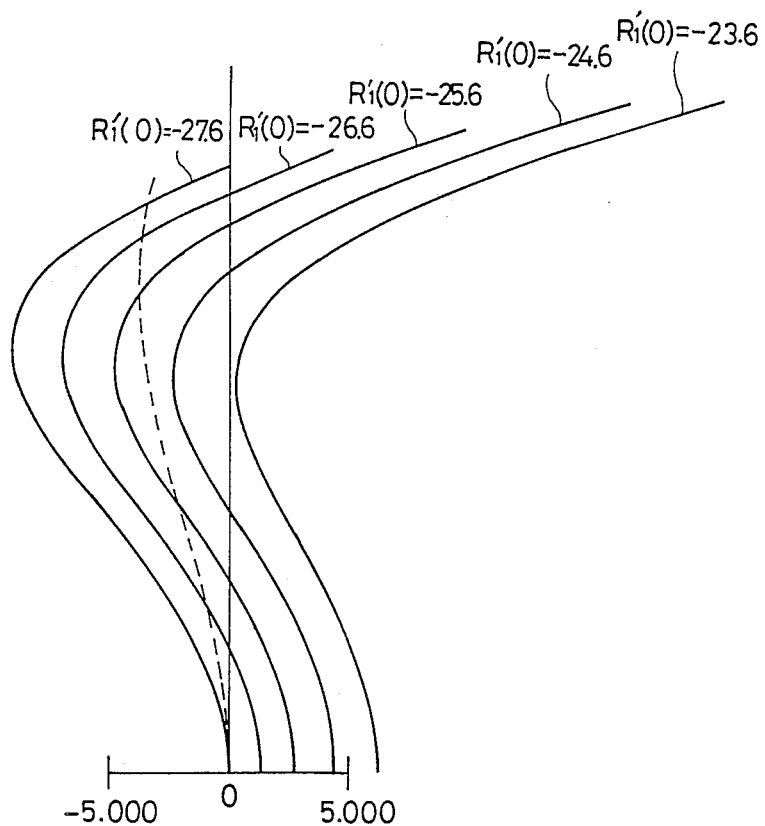
FIG. 6 is a graphical view representing image curvatures of conventional lens structures in comparison to FIG. 5 with respect to the structure of the present invention.

FIG. 6 graphically represents curvature of field of a conventional cylindrical lens in comparison to the above-mentioned embodiment of the present invention. The conventional structure to be compared comprises a second image forming lens (6) which has a conventional and normal cylindrical surface (radius of curvature $R1 = \infty$ in the main scanning direction and radius of curvature $R1' = R1'(0)$ in the sub-scanning direction) on the side facing to the deflection mirror instead of the distorted cylindrical surface of the second image forming lens 6 mentioned above in accordance with the present invention.

It can be seen from the graph of FIG. 6 that, in accordance with the structure comprising the conventional cylindrical surface instead of the featured distorted cylindrical surface, curvature of image in the sub-scanning direction is not fully corrected and varies so much in accordance with the value of $R1'(0)$.

This means that the distorted cylindrical surface of the present invention is formed by selecting radii of curvature which fully correct curvature of feild in the sub-scanning direction according to the deflection angle of the deflected bundle of rays and appropriately arranging the radii of curvature to define the lens surface shape.

In the optical scanning system in accordance with the present invention mentioned above, it is necesssary to move the scanning beam at a constant speed on the scanning surface. An F-theta lens is known and used as a means for moving the scanning beam at a constant speed.

However, using the F-theta lens is not preferable, as previously mentioned, from the stand points of simplification of the optical system, widening the field angle, curvature of image, and further, requirement for a high accuracy when producing, and the cost thereof.

Therefore, in accordance with the present invention, mispositioning or misalignment of the scanning beam is corrected by an electric signal means. Such an electric correction means comprises, for example, a clock signal generator capable of generating a scanning clock whose frequency is continuously variable responsive to changes in the scanning velocity on the scanning surface. Such a clock signal generator per se is known (U.S. Pat. No. 4,729,617). By correcting mispositioning or misalignment of the scanning spot with the use of the electric correction means known per se, the scanning beam can be moved at a constant velocity on the scanning surface without using specific optical elements such as the F-theta lens.

Another embodiment of the present invention is described hereinafter with reference to FIGS. 7 to 10.

Figure 7:
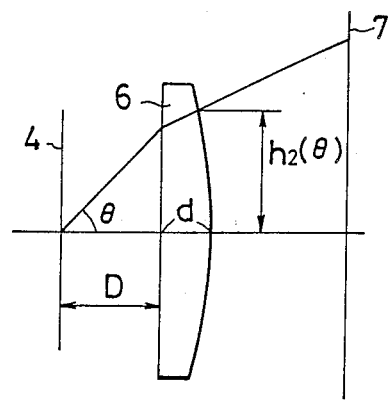
FIG. 7 is an explanatory view of the second image forming system of the present invention.
Figure 8:
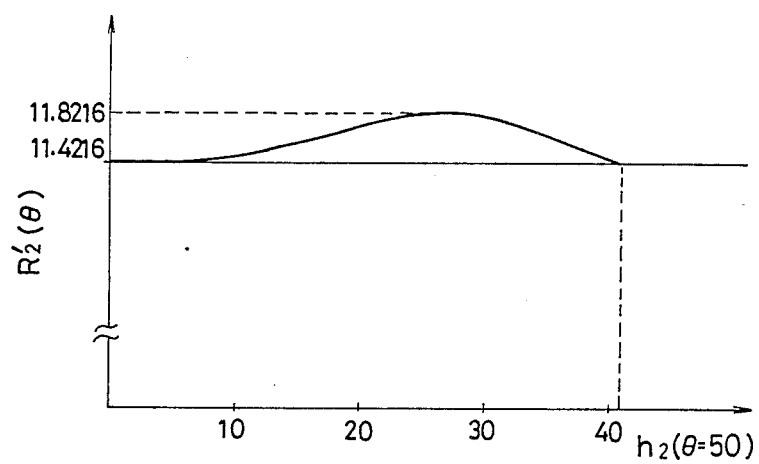
FIG. 8 is a graphical view representing the radius of curvature of toric surface side of the lens of FIG. 7.

In accordance with this embodiment, radius of curvature $R2'(\theta)$ of the lens 6 in the sub-scanning direction is changed as illustrated in FIG. 8 in response to distance $h2(\theta)$ between the emitting point of the deflected beam (deflection angle $\theta$) on the lens surface facing to the scanning surface 7 and the optical axis of the lens 6, as illustrated in FIG. 7.

Figure 9:
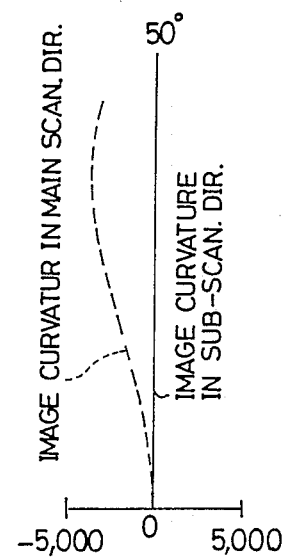
FIG. 9 is a graphical view representing image curvatures in the horizontal and vertical scanning directions with respect to the lens of FIG. 7.

By changing the radius of curvature $R2'(\theta)$ of the lens 6 according to $h2(\theta)$ as represented in FIG. 8, it becomes possible to minimize image curvature in the sub-scanning direction as represented in FIG. 9.

Figure 10:
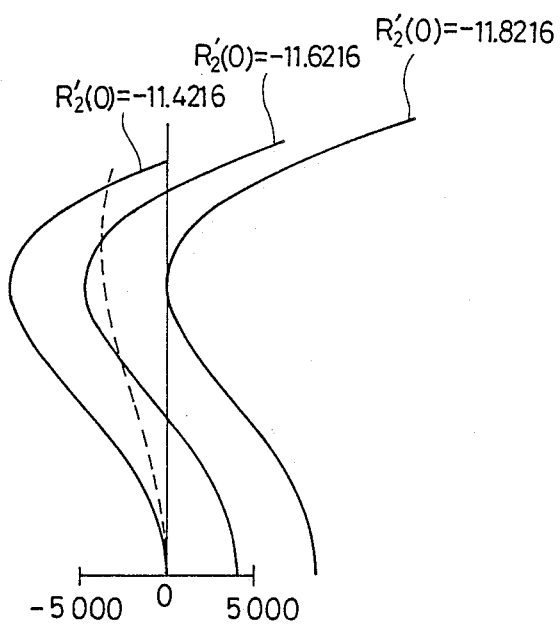
FIG. 10 is a graphical view representing image curvatures of conventional lens structures in comparison to FIG. 9 with respect to the structure of the present invention.

FIG. 10 illustrafes image curvature of a structure comprising a conventional lens surface having a constant radius of curvature same as $R2'(0)$ irrespective of $\theta$ in comparison to the result of FIG. 9. Dash line represents image curvature in the main scanning direction. Solid lines represent image curvature in the sub-scanning direction, each line representing result of a structure having radius of curvature same as $R2'(0)$ irrespective of $\theta$. As can be seen from the graph of FIG. 10, in each of the cases wherein radius of curvature is settled $-11.4216$, $-11.6216$ and $-11.8216$, image curvature in the sub-scanning direction is very large compared to the result of FIG. 9.

Still another embodiment of the present invention is described hereinafter with reference to FIGS. 11 to 13.

Figure 13:
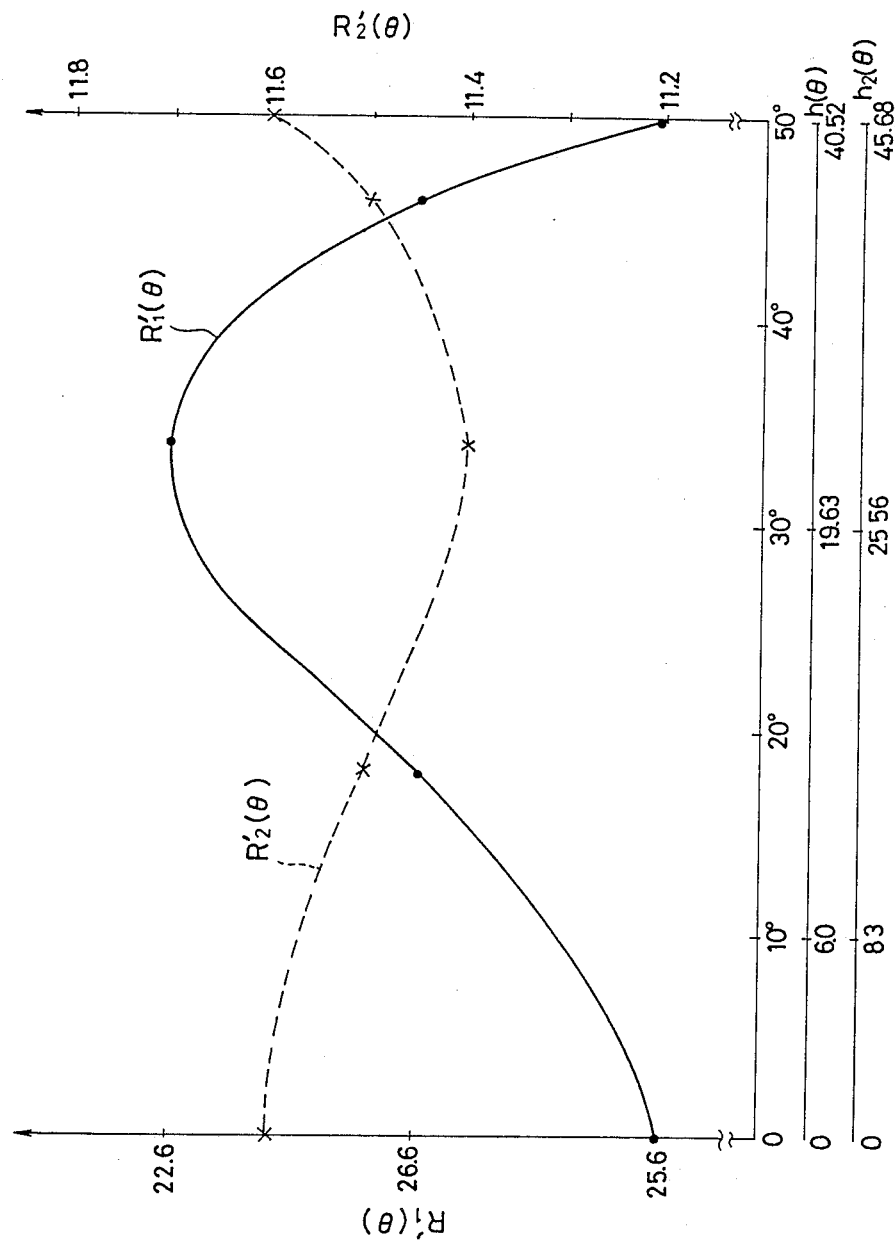
FIG. 13 is a graphical view representing the radius of curvature of the embodiment of FIG. 11.

In this embodiment, radius of curvature $R1'(\theta)$ of the incident side surface of the lens 6 with respsect to the sub-scanning direction and radius of curvature $R2'(\theta)$ of the emitting side surface of the lens 6 with respect to the sub-scanning direction are changed according to the field angle $\theta$ as illustrated in FIG. 13. By changing $R1'(\theta)$ together with $R2'(\theta)$, it becomes possible to minimize image curvature in the sub-scanning direction as illustrated in FIG. 11.

Figure 12:
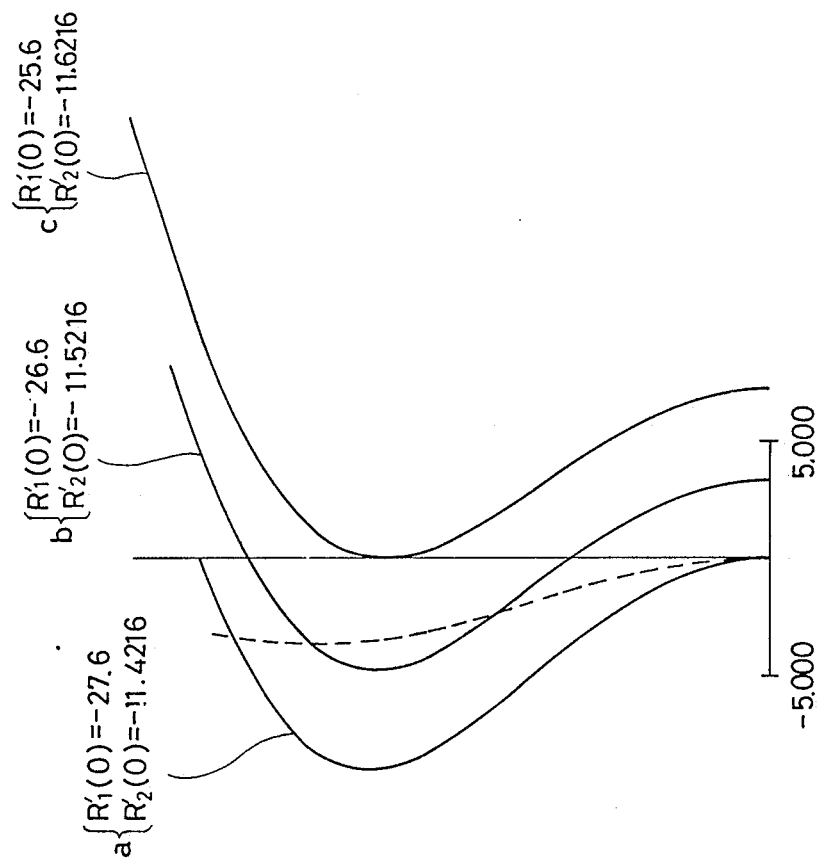
FIG. 12 is a graphical view representing image curvatures of conventional lens structures in comparison to FIG. 11 with respect to a lens structure in accordance with the present invention.
Figure 11:
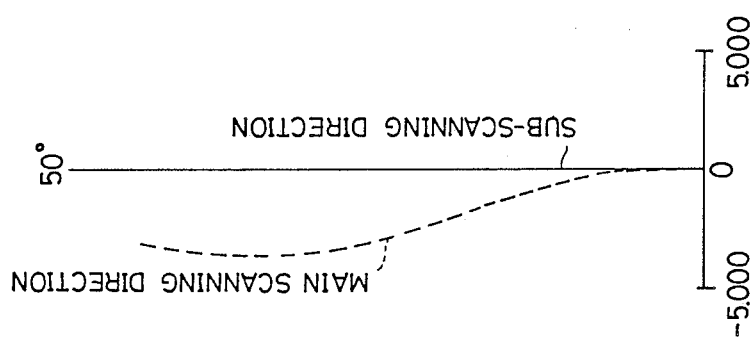
FIG. 11 is a graphical view representing image curvatures in the horizontal and vertical scanning directions with respect to another embodiment of the present invention.

FIG. 12 represents image curvuature of a structure comprising conventional lens surfaces wherein $R1'(\theta)$ and $R2'(\theta)$ are settled constant in comparison to the result of FIG. 11. Dash line represents image curvature in the main scanning direction. Solid lines represent image curvature in the sub-scanning direction. As can be seen from the graph in FIG. 12, in each of lines a, b and c which represent result of structures having a constant radius of curvature settled, image curvature in the direction of sub-scanning is very large compared to the result of FIG. 11.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scanning system comprising: a light source;
    an optical condenser system for condensing a bundle of rays emitted from said light source;
    a first image forming system for converging the bundle of rays passed through said condenser system to form a line-like image longitudinal in a main scanning direction;
    a deflection device having a deflection mirror at a position of or in the vicinity of said line-like image; and
    a second image forming system for converging said bundle of rays deflected by said deflection device on a scanning surface so as to form a scanning spot thereon;
    wherein said second image forming system comprises a single lens arranged in such a way that, with respect to the main scanning direction, an imaginary convergent point of the bundle of rays through said condenser system behind said scanning surface is positioned in conjugate relation with said scanning surface, while with respect to a sub-scanning direction, said deflection mirror is positioned in conjugate relation with said scanning surface, and wherein said single lens has a distorted cylindrical surface featured by that refractive power in the sub-scanning direction varies according to the position along the main scanning direction and a toric surface featured by that refractive power in the main scanning direction and that in the sub-scanning direction are positive and different from each other.

2. An optical scanning system according to claim 1, wherein the system further comprises an electric correction means for maintaining the velocity of the scanning spot constant of said scanning surface.

3. An optical scanning system according to claim 2, wherein said electric correction means comprises a clock signal generator which is capable of generating a scanning clock whose frequency is continuously variable responsive to changes in the scanning velocity on said scanning surface.

4. An optical scanning system according to claim 1, 2 or 3, wherein on said distorted cylindrical surface of said single lens, radius of curvature $R1'(\theta)$ in the sub-scanning direction changes responsive to distance $h(\theta)$ from the lens axis corresponding to the field angle $\theta$.

5. An optical scanning system according to claim 1, 2 or 3, wherein on said toric surface of said single lens, radius of curvature $R2'(\theta)$ in the sub-scanning direction changes responsive to distance $h2(\theta)$ from the lens axis corresponding to the field angle $\theta$.

6. An optical scanning system according to claim 1, 2 or 3, wherein on said distorted cylindrical surface and toric surface of said single lens, radii of curvature $R1'(\theta)$ and $R2'(\theta)$ in the sub-scanning direction change responsive to distance $h(\theta)$ and distance $h2(\theta)$ from the lens axis, respectively, corresponding to the field angle $\theta$.

* * * * *